United States Patent
Hughes et al.

(10) Patent No.: US 10,626,579 B1
(45) Date of Patent: Apr. 21, 2020

(54) INTEGRATED WATER RECYCLE SYSTEM

(71) Applicants: Eugene A. Hughes, San Francisco, CA (US); James L. Regens, Nichols Hills, OK (US)

(72) Inventors: Eugene A. Hughes, San Francisco, CA (US); James L. Regens, Nichols Hills, OK (US)

( * ) Notice: Subject to any disclaimer, the term of this patent is extended or adjusted under 35 U.S.C. 154(b) by 95 days.

(21) Appl. No.: 15/971,579

(22) Filed: May 4, 2018

(51) Int. Cl.
| | | |
|---|---|---|
| *E03B 1/04* | (2006.01) | |
| *C02F 1/00* | (2006.01) | |
| *B01F 5/02* | (2006.01) | |
| *B01F 3/08* | (2006.01) | |
| *C02F 103/00* | (2006.01) | |

(52) U.S. Cl.
CPC ............ *E03B 1/042* (2013.01); *B01F 3/0865* (2013.01); *B01F 5/0206* (2013.01); *C02F 1/001* (2013.01); *B01F 2215/0052* (2013.01); *C02F 2103/001* (2013.01); *C02F 2103/002* (2013.01); *C02F 2201/005* (2013.01)

(58) Field of Classification Search
CPC . E03B 1/041; E03B 1/042; E03B 1/04; Y10T 137/2526; Y10T 137/2572; Y10T 137/3112; Y10T 137/8597; Y10T 137/85978; C02F 2103/002; C02F 2201/002; C02F 1/006
USPC ........ 137/101.11, 114, 205.5, 564.5, 565.01, 137/550; 417/65, 503; 210/170.01, 210/747.1
See application file for complete search history.

(56) References Cited

U.S. PATENT DOCUMENTS

| | | | | |
|---|---|---|---|---|
| 4,412,428 A * | 11/1983 | Giannella | .............. | A23G 9/281 366/155.1 |
| 4,984,306 A * | 1/1991 | Sumerix | ................... | E03D 9/02 137/218 |
| 5,219,455 A * | 6/1993 | Trucco | ..................... | A23G 9/20 366/182.2 |
| 6,221,321 B1 * | 4/2001 | Fleischer | .............. | B01F 1/0033 210/198.1 |
| 6,314,979 B1 * | 11/2001 | Lips | ..................... | A01C 23/042 137/205.5 |
| 7,534,070 B1 * | 5/2009 | Urban | .................... | A01G 25/00 405/51 |
| 8,051,873 B2 * | 11/2011 | Mullen | ..................... | E03F 5/22 137/371 |
| 8,261,764 B2 * | 9/2012 | Miller | ...................... | F04F 5/04 137/205.5 |
| 8,507,138 B2 * | 8/2013 | Yamada | .................... | F04F 5/18 137/114 |
| 8,557,126 B2 * | 10/2013 | Futch | ................... | B01F 5/0428 137/101.11 |
| 2003/0213745 A1 * | 11/2003 | Haerther | ................... | C02F 3/32 210/602 |

(Continued)

*Primary Examiner* — Jessica Cahill
(74) *Attorney, Agent, or Firm* — Gable Gotwals

(57) ABSTRACT

An integrated system to collect, store, and recycle water from rain runoff, bathing, showering, and/or kitchens for use as a substitute for potable water in landscape irrigation or other applications. In embodiments a tank that includes a jet pump is installed near, at, or below grade in a lawn or planted area near the main water supply to a facility such as, but not limited to, a residential home. The jet pump, which requires no motive force other than a pressurized water flow, accelerates water flow into a funnel type device that draws in the collected water to mix with clean water.

19 Claims, 2 Drawing Sheets

(56) References Cited

U.S. PATENT DOCUMENTS

| | | | |
|---|---|---|---|
| 2004/0168992 A1* | 9/2004 | Ben-Amotz | E03B 1/04 210/805 |
| 2007/0163649 A1* | 7/2007 | Yamagishi | F04F 5/04 137/114 |
| 2008/0295237 A1* | 12/2008 | Kurtz | E03D 5/003 4/322 |
| 2010/0147516 A1* | 6/2010 | Betzer-Zilevitch | B03D 1/02 166/272.6 |
| 2011/0174194 A1* | 7/2011 | Hird | C04B 28/04 106/639 |
| 2012/0037234 A1* | 2/2012 | Eckman | B01D 29/035 137/1 |
| 2012/0090707 A1* | 4/2012 | Marugame | E03B 1/042 137/565.01 |
| 2013/0001141 A1* | 1/2013 | Berkey | B01D 35/26 210/90 |

* cited by examiner

INTEGRATED WATER RECYCLE SYSTEM

BACKGROUND

This disclosure is in the field of systems and methods that facilitate the use of recycled water for landscape and irrigation applications or other uses such as but not limited to sidewalk cleaning and car washing.

Potable water can be scarce or expensive in a number of locations. Recycling water to support landscape applications is an attractive alternative to using potable water. Currently systems collect runoff rainwater but few systems are available to reclaim shower or bath water and kitchen water. The systems that collect runoff rain water are generally used manually and do not feed sprinklers or equivalent without adding a new pumping system. The same is true of systems that reclaim the shower, bath, and kitchen water.

SUMMARY

Embodiments of this disclosure provide an integrated water recycle system that can supply collected water easily for uses including but not limited to landscape or irrigation applications and cleaning applications. In embodiments, a water collection tank is installed near, at, or below grade in a lawn or planted area or other appropriate location near the main water supply to a facility such as, but not limited to a residential home or a residential or commercial building. The tank may be connected to main water supply and to sources of collected water such as rain gutters or from the kitchen and bathroom sink and shower of the facility. The tank may be fitted with a jet pump to mix collected water with the fresh water, with the mixed water being sent to a landscape irrigation application such as, but not limited to, a sprinkler system.

NUMBERING AND ELEMENTS USED IN THE DRAWINGS

Figure 1:
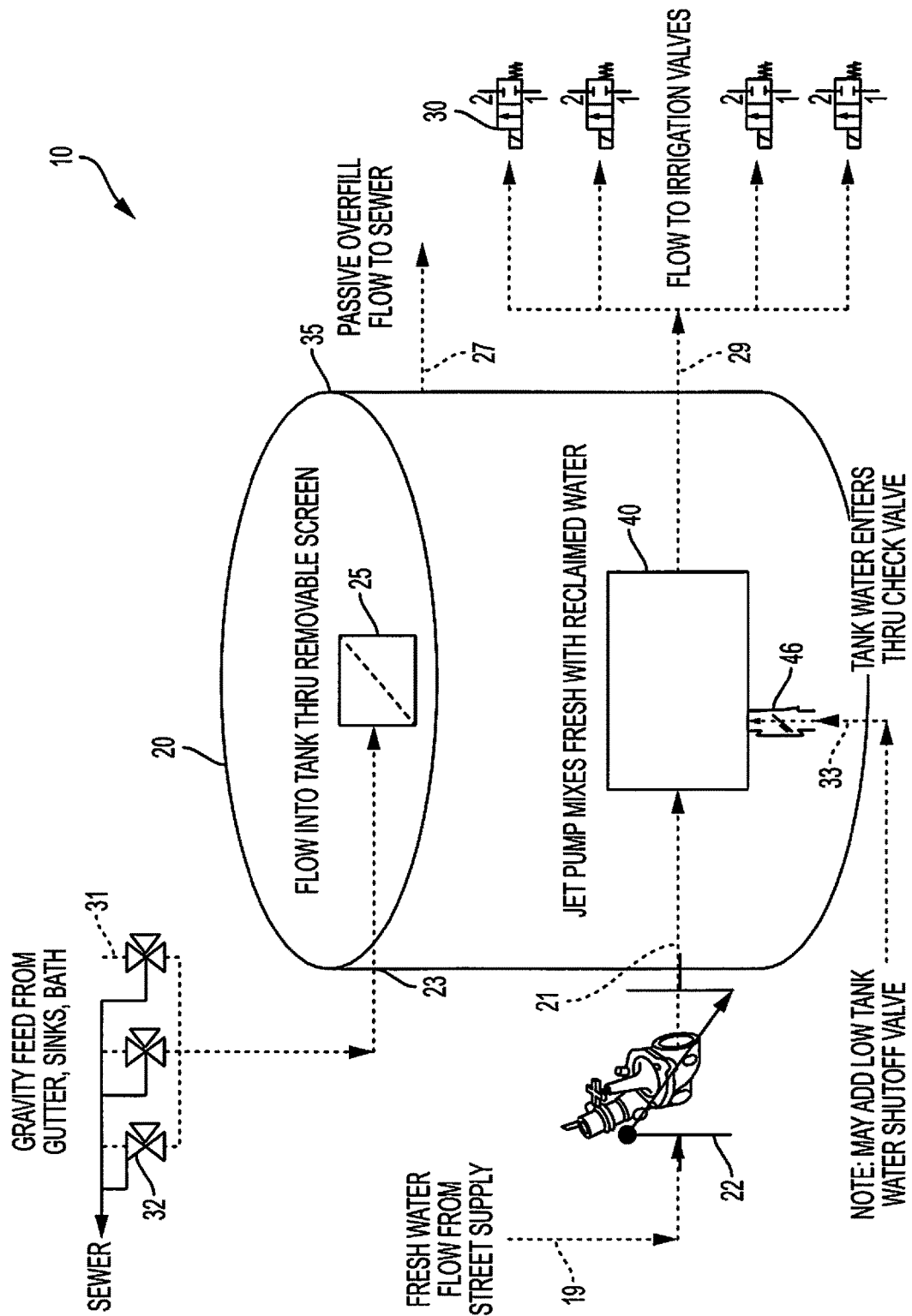
FIG. 1 is a schematic illustrating an embodiment of this disclosure.
Figure 2:
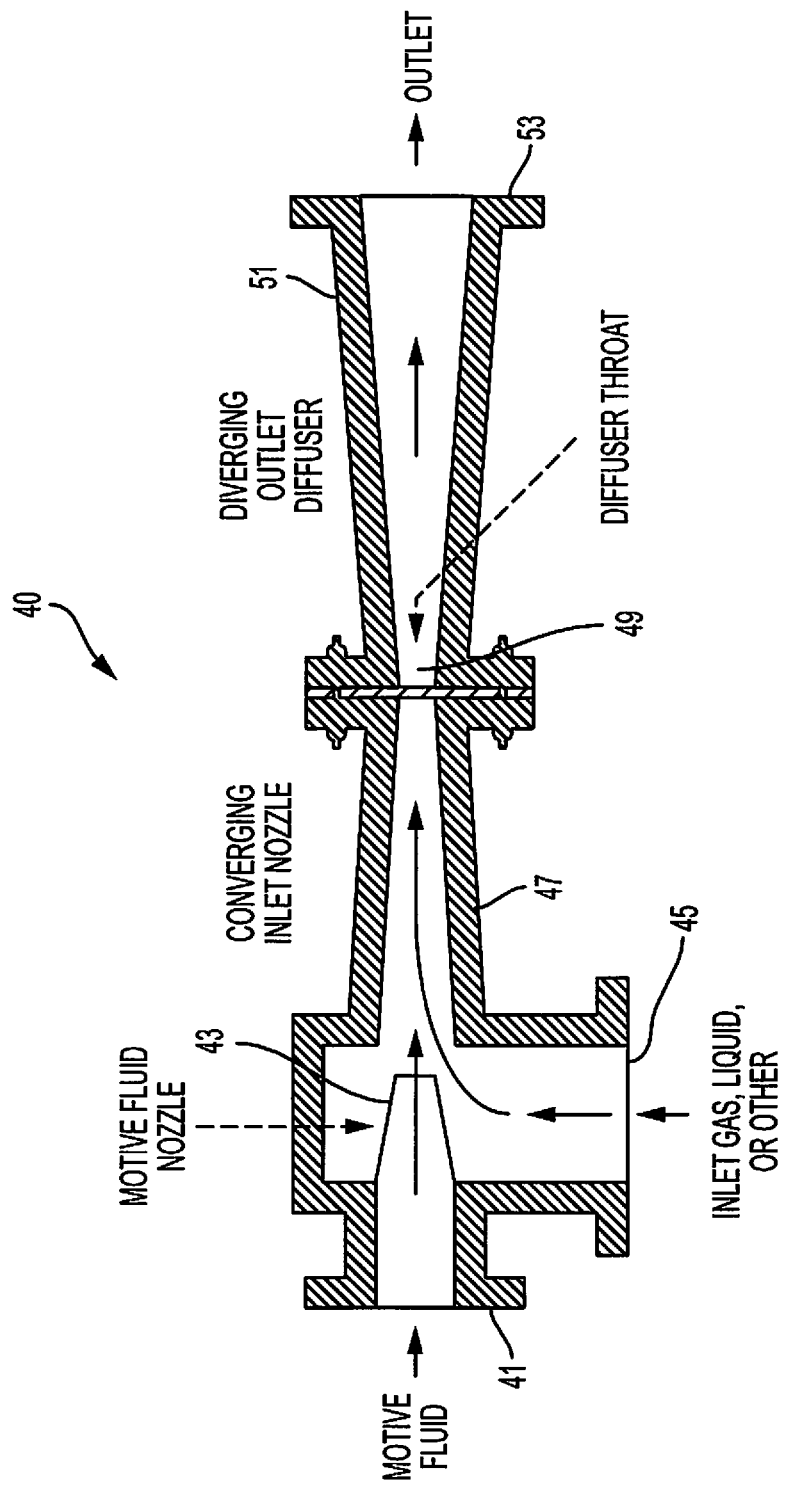
FIG. 2 is a schematic illustrating an embodiment of a jet pump.

10 Integrated water recycle system
19 Fresh water supply
20 Water collection tank
21 Fresh water inlet
22 Fresh water inlet control valve
23 Collected water inlet
25 Filter
27 Overfill outlet
29 Water outlet
30 Water outlet flow control valve
31 Collected water supply
32 Collected water flow control valve
33 Low tank water shutoff
35 Uppermost end of 20
40 Jet pump
41 Motive fluid inlet end
43 Motive fluid nozzle
45 Collected water inlet
46 Check valve
47 Converging inlet nozzle
49 Throat area
51 Diverging outlet diffuser
53 Outlet

DETAILED DESCRIPTION

Embodiments of an integrated water recycle system of this disclosure include a water collection tank in flow communication with a main water supply of fresh (e.g. potable or clean water, typically at a street or municipal pressure) water and one or more sources of collected (grey) water such as a rain gutter, a kitchen or bathroom sink, or a shower or tub. In embodiments, the sources of collected water may be equipped with a valve that diverts water to the water collection tank for reclamation or to a sewer when necessary (e.g., during tank maintenance or cleaning)—to a sewer system. The water collection tank may be fitted with an overflow to the sewer. The overflow may be a diversion pipe. That water collection tank may be made of any material suitable and of any size (capacity) suitable for the facility and landscape irrigation application to which the tank is connected. In some embodiments, the water collection tank has the capacity of a 55-gallon drum.

The connection to the main water supply, which may be a pressurized fresh water supply such as a municipal street-side supply, may include a valve to prevent water from flowing into the water collection tank until fresh water is needed for a landscape irrigation application that is in flow communication water outlet of the tank. The water collection tank may be equipped with a jet pump including a fresh water inlet and a collected water inlet, with the jet pump mixing the two water sources and sending the mixed water to the water outlet. Alternatively, the jet pump may send only the fresh water to the outlet when the water collection tank is either low on collected water or empty of collected water. The jet pump may include a back-flow check valve to prevent water from entering the water collection tank from fresh water supply when pressure is high downstream of the tank, for example, before one or more valves open in the landscape irrigation application.

By way of a non-limiting example, an operation of embodiments for landscape irrigation, fresh water entering the jet pump from the main water supply draws the collected water residing in the water collection tank into the flow stream, thereby reducing the amount of fresh water used. The landscape irrigation application, which can be a sprinkler system, may first open the valve of the main water supply to the water collection tank but no fresh water would flow into the tank as a back-flow check valve or other type valve prevents the flow. Next, in this embodiment the sprinkler system opens at least one of one or more sprinkler solenoid valves together or in groups. The opening and closing of the valves may be controlled with a timer. In some embodiments, one or more of the valves may be controlled by a microprocessor and associated software.

Once opened, flow occurs from the main water supply into the tank and collected water residing within the tank is added by the jet pump passively, where the two water sources are mixed. When the water collection tank is empty or contains insufficient water to be effective, the sprinkler system may continue to operate using only the fresh water being supplied by the main water supply. The tank remains empty as the check valve prevents flow of clean water to the tank. The inlet valve for the main water supply to the tank remains open until all stations of the sprinkler system are completed, at which time the inlet valve closes.

In embodiments, the integrated water recycle system uses no external power supply to pump water from the water collection tank to the landscape irrigation application. In some embodiments, no sensors are needed to prevent overflow of the water collection tank because of the built-in overflow or overfill outlet.

Referring now to the drawing figures, embodiments of an integrated water recycle system 10 of this disclosure includes a water collection tank 20 having a freshwater inlet 21 capable of connection to a pressurized freshwater supply 19 such as, but not limited to, a municipal water supply, a greywater inlet 23 capable of connection to one or more pumped or gravity-fed greywater supplies 31 such as, but not limited to, a rainwater source or a household sink or shower or bath water source; and a jet pump 40 in communication with the freshwater inlet 21, the greywater residing within the tank 10, and a water outlet 29. The water collection tank may be located in close proximity to a facility such as, but not limited to, a residential home or a residential or commercial building. In embodiments, an uppermost end 35 of the tank 20 may be located below, at, or near ground level. An overflow or overfill outlet 27 may be included toward an uppermost end 35 of the tank 20 to divert the greywater to a sewer system. The water collection tank 20 may include a low tank water shut-off valve 33. In some embodiments, valve 33 may include a float, with flow prevented when the float is at a predetermined low level, until the tank 20 is filled again to a predetermined higher level.

In embodiments, a freshwater inlet flow control valve 22, which may be a backflow check valve or solenoid valve, is located between the pressurized freshwater supply 19 and the freshwater inlet 21. Backflow from the greywater residing within tank 20 to the pressurized freshwater supply 19 may be prevented by design of the fresh water inlet flow control valve 22. At least one pipe connects the gravity-fed greywater supply 31 to the greywater inlet 23 and may include one or more valves 32 for controlling a flow of the gravity-fed greywater to the greywater inlet 23 or diverting that flow to a sewer system. The greywater inlet 23 may include a filter 25 sized to remove or screen debris contained in the greywater and prevent its entry to the tank 20. In some embodiments, filter 25 includes a removeable screen.

The water outlet 29 may be configured for connection to a downstream application that requires water. For example, in embodiments the water outlet may be configured for connection to a landscape irrigation application such as, but not limited to, a sprinkler system. At least one water outlet flow control valve 30, which may be a solenoid valve, controls flow to the landscape irrigation application. The valve 30 may be in electronic communication with a timer or may be controlled by a microprocessor and associated software. When in use, the freshwater inlet flow control valve 22 opens and then water outlet control valve 30 opens. Alternatively, the water outlet flow control valve 30 may open and then the freshwater inlet control valve 22 opens. The freshwater inlet flow control valve 22 remains open until all stations of the landscape irrigation application are completed, at which time the inlet valve 22 closes with all valves 30 closed. A check-valve 46 prevents pressurized freshwater flow into the tank 20.

Because of the jet pump 40, operation of the system 10 requires no external power source other than the pressurized freshwater supply 19. In embodiments, the jet pump 40 may include a throat area 49 connecting a funnel-shaped converging inlet nozzle 47 located toward a fresh water inlet connection end 41 and a funnel-shaped diverging outlet diffuser 51 located toward at a water outlet connection end 53. A check-valve 46 may be located toward the end 41.

When in use, pressurized freshwater enters the jet pump 40 through the freshwater inlet 21 and into a motive fluid nozzle 43 of the jet pump. The pumped or gravity-fed greywater residing in the water collection tank 10 enters or gets sucked into the jet pump 40 through the check valve 46 as the freshwater exits the motive fluid nozzle 43. The mixed waters then enter the converging inlet nozzle 47 and the diverging outlet diffuser 51 before exiting at the outlet 53.

While embodiments of an integrated water recycle system and a method of its use have been described, modifications can be made to the details of construction without departing from the scope of this disclosure. The following claims and their recited elements and limitations include the full range of equivalents to which they are entitled.

The invention claimed is:

1. A water recycling system comprising:
    a water collection tank including:
        a freshwater inlet capable of connection to a pressurized freshwater supply;
        a greywater inlet capable of connection to a gravity-fed greywater supply;
        a water outlet;
        a low tank water shut-off valve; and
        a jet pump including a check-valve, a fresh water inlet connection at one end, and a water outlet connection at another end;
    wherein a pressurized freshwater enters the jet pump through the freshwater inlet and a gravity-fed greywater residing in the water collection tank enters the jet pump through the check-valve.

2. A water recycling system according to claim 1, further comprising a check valve located between the pressurized freshwater supply and the freshwater inlet.

3. A water recycling system according to claim 1, further comprising a greywater flow valve located between the gravity-fed greywater supply and the greywater inlet.

4. A water recycling system according to claim 1, further comprising the greywater inlet including a filter.

5. A water recycling system according to claim 4, the filter including a removeable screen.

6. A water recycling system according to claim 1, the water outlet capable of connection to a landscape irrigation device.

7. A water recycling system according to claim 6, further comprising at least one water outlet flow control valve.

8. A water recycling system according to claim 1, the water collection tank further including an overfill outlet.

9. A water recycling system according to claim 1, further comprising:
    a valve controlling a flow of the gravity-fed greywater to the greywater inlet.

10. A water recycling system according to claim 1, wherein the gravity-fed greywater supply includes a rainwater source.

11. A water recycling system according to claim 1, further comprising:
    the freshwater inlet including a freshwater inlet flow control valve.

12. A water recycling system according to claim 11, the freshwater inlet flow control valve including a backflow check valve.

13. A water recycling system according to claim 1, the water outlet including a water outlet flow control valve.

14. A water recycling system according to claim 13, the water outlet flow control valve including a solenoid valve.

15. A water recycling system according to claim 1, wherein the water collection tank does not include a sensor.

16. A water recycling system according to claim 1, wherein the pressurized freshwater supply includes a source of municipal water.

17. A water recycling system according to claim 1, wherein operation of the water collection tank requires no external power source, other than the pressurized freshwater supply.

18. A method of reclaiming greywater, the method comprising:
- receiving greywater from at least one source of greywater into a water collection tank, the water collection tank including:
  - a freshwater inlet connected to at least one source of pressurized freshwater supply;
  - a greywater inlet connected to a gravity-fed greywater supply;
  - a water outlet;
  - a low tank water shut-off valve; and
  - a jet pump including a check-valve, a fresh water inlet connection at one end, and a water outlet connection at another end;
- receiving freshwater from the at least one source of pressurized freshwater into the water collection tank;
- sending the received greywater and freshwater through the jet pump located within the water collection tank when a water outlet flow control valve is opened on an outlet side of the water collection tank;

wherein a pressurized freshwater enters the jet pump through the freshwater inlet and a gravity-fed greywater residing in the water collection tank enters the jet pump through the check-valve.

19. The method of claim 18, further comprising:
- preventing freshwater from entering the jet pump when the water outlet flow control valve is closed.

* * * * *